US011779869B2

(12) United States Patent
Weislogel et al.

(10) Patent No.: US 11,779,869 B2
(45) Date of Patent: Oct. 10, 2023

(54) MULTIPLEX INERTIAL FILTER, COLLECTOR AND SEPARATOR

(71) Applicants: IRPI LLC, Wilsonville, OR (US); The United States of America as represented by the Administrator of the National Aeronautics and Space Administration, Washington, DC (US)

(72) Inventors: Mark M. Weislogel, Wilsonville, OR (US); John C. Graf, Houston, TX (US); Nora D. Shapiro, Tempe, AZ (US); Logan Torres, Wilsonville, OR (US); Rawand M. Rasheed, Houston, TX (US); Ryan Jenson, Wilsonville, OR (US)

(73) Assignees: IRPI LLC, Wilsonville, OR (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 17/455,736

(22) Filed: Nov. 19, 2021

(65) Prior Publication Data

US 2023/0120148 A1    Apr. 20, 2023

Related U.S. Application Data

(60) Provisional application No. 63/262,803, filed on Oct. 20, 2021.

(51) Int. Cl.
*B01D 45/16* (2006.01)
*B33Y 80/00* (2015.01)

(52) U.S. Cl.
CPC .............. *B01D 45/16* (2013.01); *B33Y 80/00* (2014.12)

(58) Field of Classification Search
CPC ............................... B01D 45/16; B33Y 80/00
See application file for complete search history.

(56) References Cited

U.S. PATENT DOCUMENTS

2018/0147534 A1* 5/2018 Lescoche ............. B01D 63/063

OTHER PUBLICATIONS

Wines, T. et al., "Liquid-Gas Coalescers: Demystifying Performance Ratings," Chemical Engineering Online Website, Available Online at https://www.chemengonline.com/liquid-gas-coalescers-demystifying-performance-ratings/,Jul. 1, 2011, 8 pages.
Baran, E. et al., "Surface Modification of 3D Printed PLA Objects by Fused Deposition Modeling: A Review," Colloids and Interfaces, vol. 3, No. 2, Mar. 29, 2019, 25 pages.

(Continued)

*Primary Examiner* — Rick K Chang
(74) *Attorney, Agent, or Firm* — McCoy Russell LLP

(57) ABSTRACT

Methods and systems are provided for a multiplexed phase separating inertial filter that is composed of helical through holes generating centrifugal separating forces. In one example, the inertial filter may be a planar porous material with an array of helical channels, each helical channel of the array of helical channels extending from a top surface of the porous material to a bottom surface of the porous material.

10 Claims, 12 Drawing Sheets

(56) References Cited

OTHER PUBLICATIONS

"Selective Laser Sintering: Choose Robust SLS 3D Printing for Complex, Tough, Functional Parts.," 3D Systems Website, Available Online at https://www.3dsystems.com/selective-laser-sintering, Available as Early Aug. 4, 2020, 13 pages.

"Mist Collection: Fundamentals & Applications," Donaldson Website, Available Online at https://www.donaldson.com/en-us/industrial-dust-fume-mist/technical-articles/mist-collection-fundamentals-applications/. Retrieved on Nov. 17, 2021, 9 pages.

Prusa, J., "PRUSA Research—Introduction & download," PRUSA 3D Website, Available Online at https://www.prusa3d.com/page/prusaslicer_424/, Retrieved on Nov. 17, 2021, 7 pages.

* cited by examiner

MULTIPLEX INERTIAL FILTER, COLLECTOR AND SEPARATOR

CROSS REFERENCE TO RELATED APPLICATION

The present application claims priority to U.S. Provisional Application No. 63/262,803, entitled "MULTIPLEX INERTIAL FILTER, COLLECTOR AND SEPARATOR," and filed on Oct. 20, 2021. The entire contents of the above-listed application are hereby incorporated by reference for all purposes.

FIELD

The present description relates generally to liquid, gas, and/or solid phase separating filters.

BACKGROUND/SUMMARY

Numerous challenges are faced by the designers of life support systems for spacecraft because of the persistently unfamiliar and unforgiving low-gravity (low-g) environment. A common challenge is the collection (filtration) of liquid droplets and solid particles from gas streams. Solid-gas and liquid-gas phase separations of dust, mists, sprays, etc. are pervasive and desired in numerous engineering systems (e.g., liquid-gas sorbent chemistry, filtration, HVAC, demisters, firefighting equipment, and others). Such systems are often directly tied to life support systems such as oxygen supply, air revitalization, thermal management systems, water reclamation, medical fluids, etc. Prior solutions include active separators and fine filters, both of which possess serious shortcomings of complexity and pressure drop. Active separators involve moving parts, which are disadvantageous due to added potential points of degradation that reduce reliability while increasing mass, power consumption, and noise. Fine filters also involve significant drawbacks that include high pressure drops due to the tortuous and low open area of such filters, as well as increasing pressure drop as saturation increases. Therefore, a porous media filter capable of largely passive liquid droplet and particle collection and separation is desired.

In order to at least partially address the issues described above, a filter described herein employs a deflected pathway, such as a helical conduit geometry within a porous material, that exploits passively induced centrifugal (inertial) forces on particle/liquid laden airflows. For example, particles/droplets are driven to conduit surfaces where they adhere and are wicked inward and thus collected in the porous media. The capillary wicking force leads to the uniform passive migration of the fluid throughout the media for storage, further processing, or purge. The conduit pore dimension is expected to be larger than the media pore dimension. Thus, the variable porosity component (droplet phase separating media) exploits inertial, capillary, and wetting forces to quickly separate gas/vapor-driven droplet streams into single liquid and gas/vapor outlet flows in a short distance and with low pressure drop. In one example, the media may include interwoven helical through-holes in an otherwise porous capillary wicking media.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4-7 and 10-12 are shown approximately to scale.

DETAILED DESCRIPTION

Figure 10:
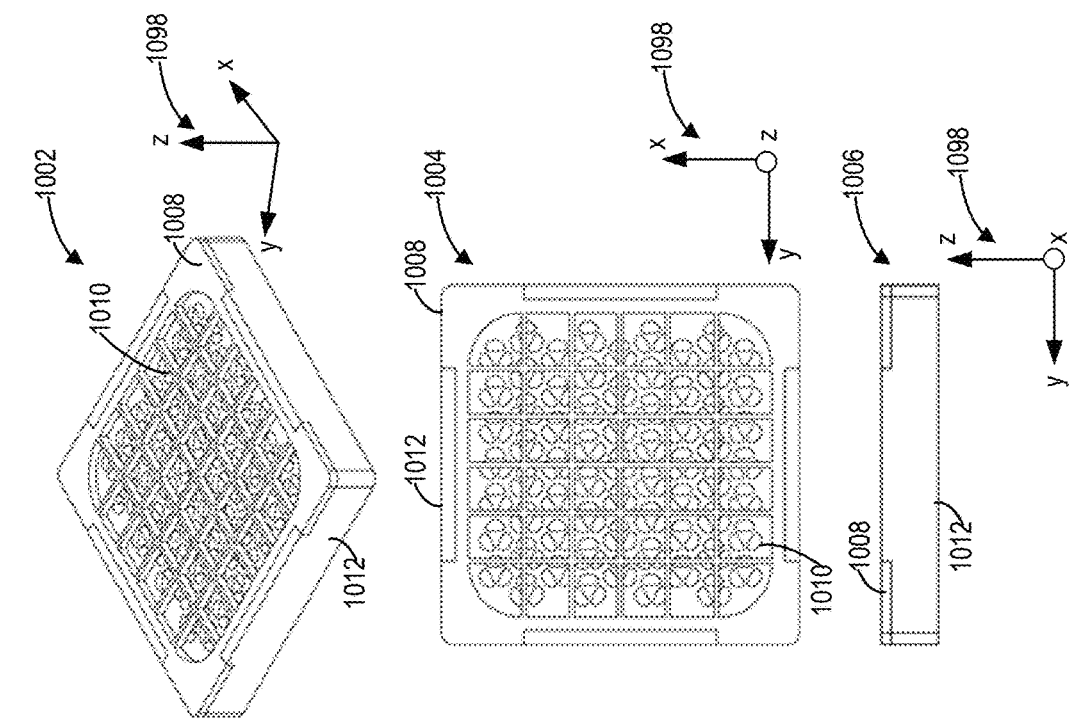
FIG. 10 shows an exploded view, an angled view, a top view, and a side view of a three-dimensional (3D) printed inertial filter with a filter housing that includes a top plate and a bottom plate.
Figure 10:
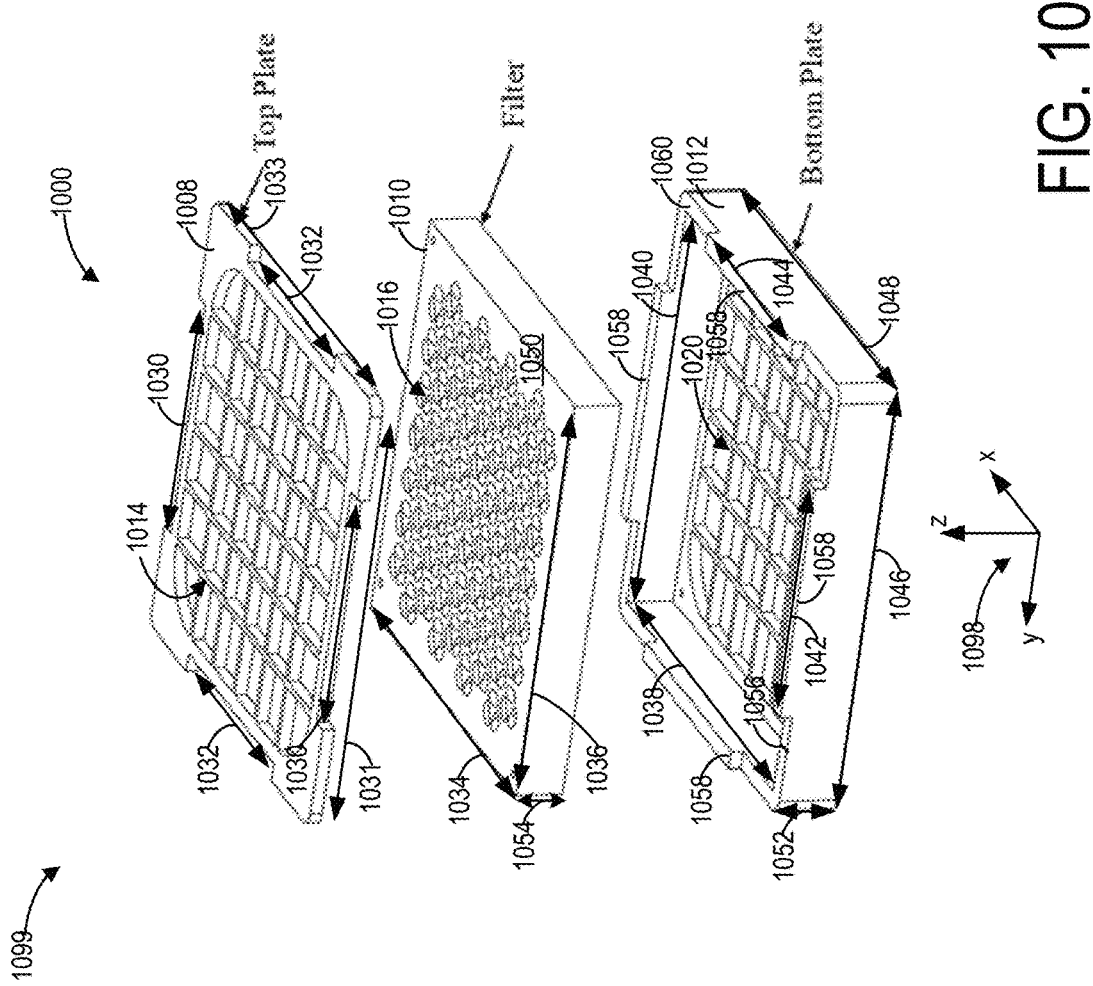
Figure 11:
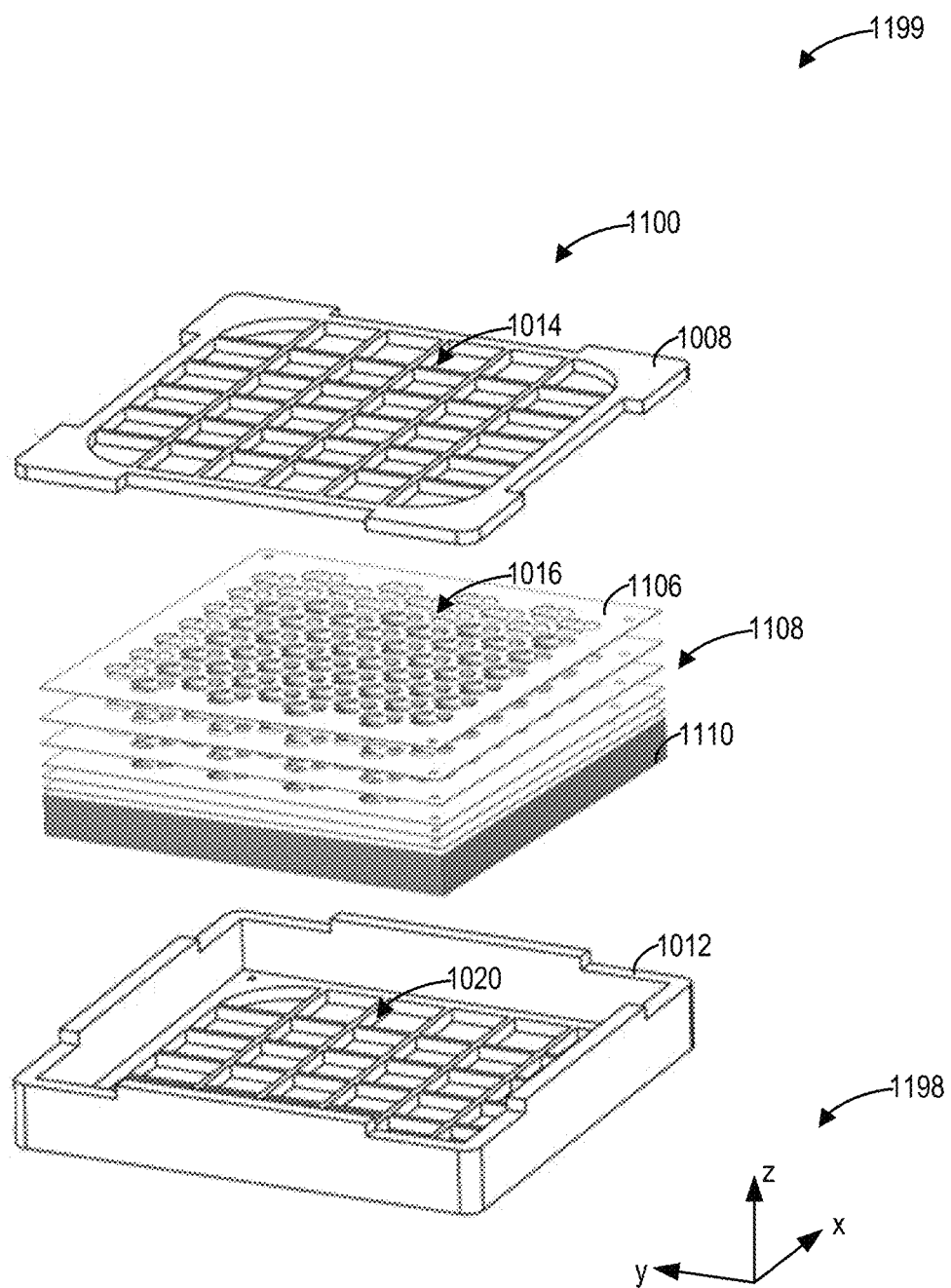
FIG. 11 shows an exploded view of a layered filter with the filter housing.
Figure 12:
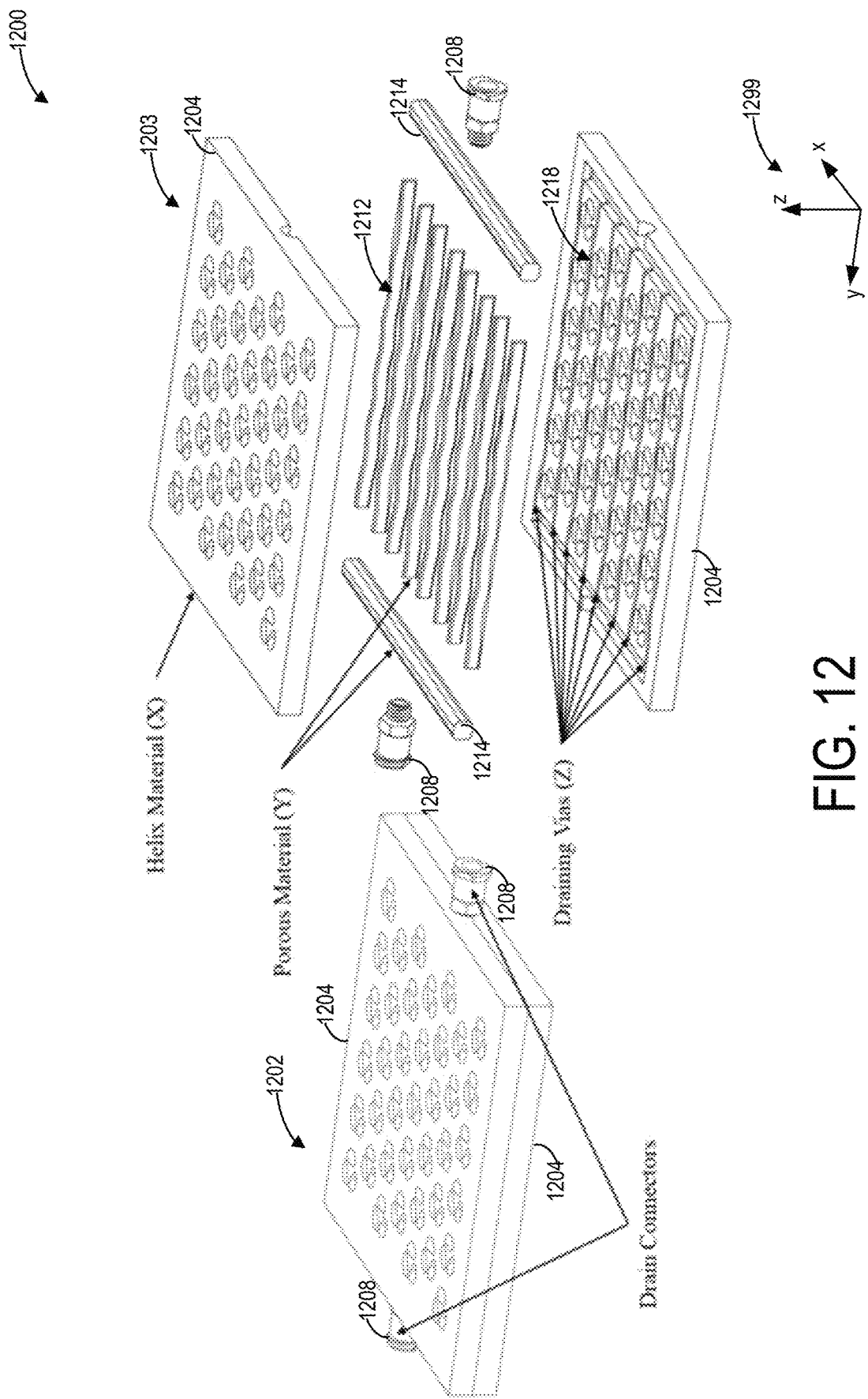
FIG. 12 shows an example assembly of an inertial filter with draining capabilities.

The following description relates to systems and methods for a multiplex phase separating inertial filter. The inertial filter may be included in a variety of applications, such as the carbon dioxide ($CO_2$) filtering system shown in FIG. 1 or the respirator shown in FIG. 2. An example of the inertial filter that shows helical channels and a porous material is illustrated in FIG. 3. The inertial filter may have helical channels that may be configured in as a single helix, shown in FIG. 4, a double helix, shown in FIG. 5, or a triple helix, shown in FIG. 6. The triple helix configuration of FIG. 6 is further exemplified in FIG. 7 as an array of triple helices. FIG. 8 schematically demonstrates how liquid is captured by the filter and gas flows through the filter. A further example of the liquid capture process through porous material is demonstrated in FIG. 9. FIGS. 10 and 11 show a 3D printed filter (e.g., a 3D printed monolith) and a layered filter made of laminate absorbent material sheets, respectively, which may be included in a housing. Additionally, in some examples, the inertial filter may also be drained of liquid to be continuously used without replacement. Therefore, an assembly allowing drainage is shown in FIG. 12.

Figure 1:
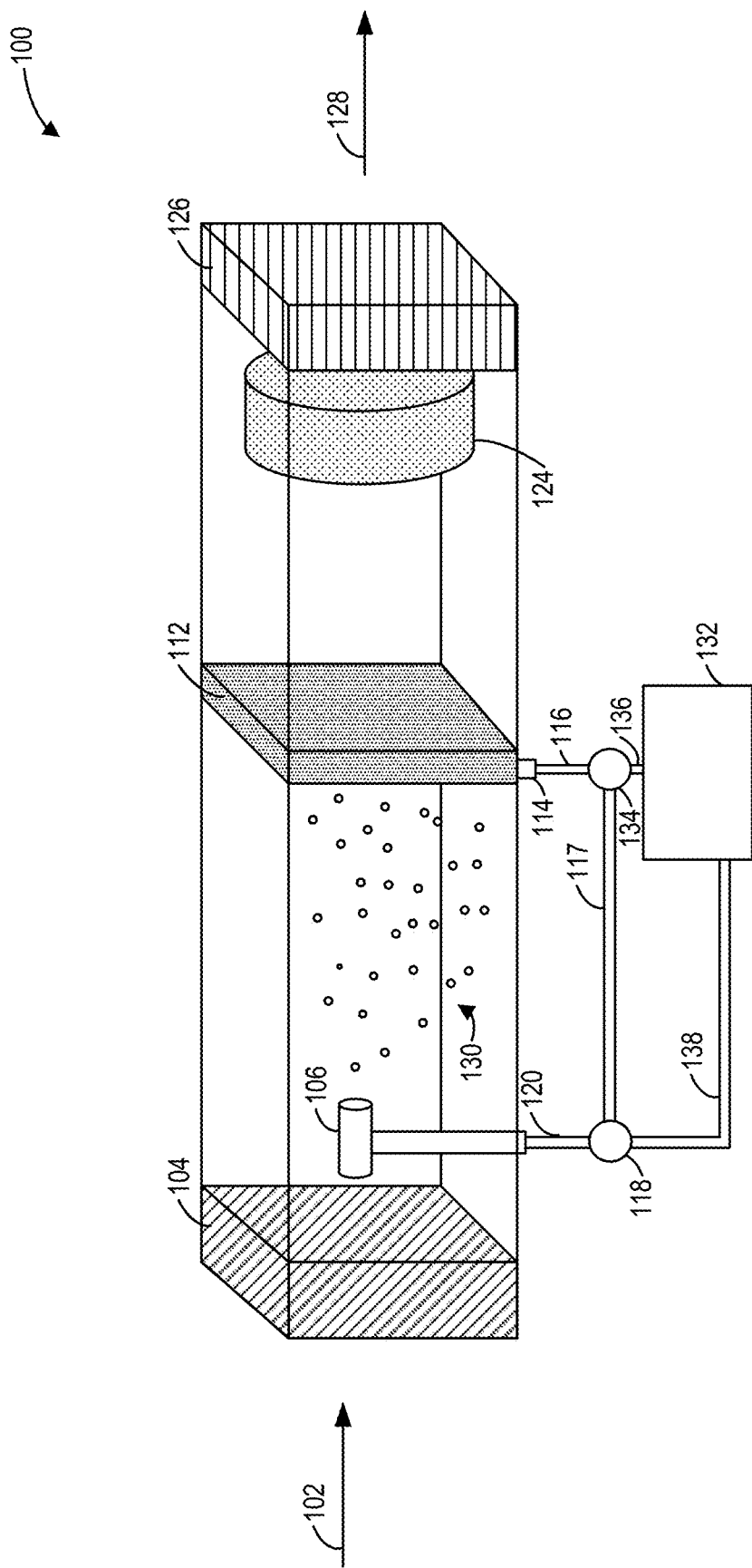
FIG. 1 shows a schematic of a filtration system incorporating an inertial filter.

Turning now to the figures, a filtering system 100 is shown in FIG. 1. The filtering system 100 includes an inertial filter 112. For example, the filtering system 100 may be used to filter carbon dioxide ($CO_2$) from air within a closed system such as a space station. Furthermore, the filtering system 100 advantageously uses the low pressure drop caused by helical channels and wicking properties of the inertial filter 112 to function in the low pressure and gravity environments of space.

The filtering system 100 includes a pre-filter 104 through which air may initially enter and may be filtered of particulates, as shown by the direction of an air flow arrow 102. A spray nozzle 106 is located downstream of the pre-filter 104. The spray nozzle 106 may introduce droplets to capture $CO_2$ within the air flow. For example, the droplet may be a liquid amine that absorbs $CO_2$, such as diglycolamine (DGA), ethanolamine (MEA), ionic liquid, etc. A high surface area of the droplets may allow for rapid absorption of the $CO_2$. A droplet laden flow 130, which includes the absorbed $CO_2$ in the liquid amines as well as the remaining air (e.g., oxygen) flows downstream of the spray nozzle 106 to the inertial filter 112. The liquid of the droplet laden flow 130 may be captured by the inertial filter 112 using an array of helical structures that utilizes centrifugal force to move the liquid to an absorbent material in the inertial filter 112. The process of the inertial filter 112 is further described with respect to FIGS. 3 and 9. Draining vias (not shown in FIG. 1) may transport the liquid from the inertial filter and flow from the inertial filter into a drain 114. The liquid may flow from the drain 114 through a first pipe 116 to a control valve 134 (e.g., bypass valve) which controls the amount of liquid that is recirculated and the amount of liquid that is processed at $CO_2$ processor 132, which processes the $CO_2$ out of the liquid. The liquid that may be processed travels from the control valve 134, through a pipe 136 to the $CO_2$ processor 132. The liquid that has been processed at 132, which is lean of $CO_2$, traverses through a pipe 138 to a pump 118 where the liquid that is lean of $CO_2$ and liquid that has been recirculated by the control valve 134 through a pipe 117 to the pump 118 may both be pumped through a pipe 120 to the spray nozzle 106.

Gases, such as oxygen and nitrogen, may flow through the inertial filter 112 and may continue to a fan 124, which may create the flow of air through the filtering system 100. The gases may then go through a high efficiency particulate air (HEPA) filter 126 to remove particulates such as dust, pollen, mold, bacteria, etc. from the air flowing through the HEPA filter 126. As a result, an air flow 128 may be droplet free and have decreased amount of particulates and $CO_2$.

Figure 2:
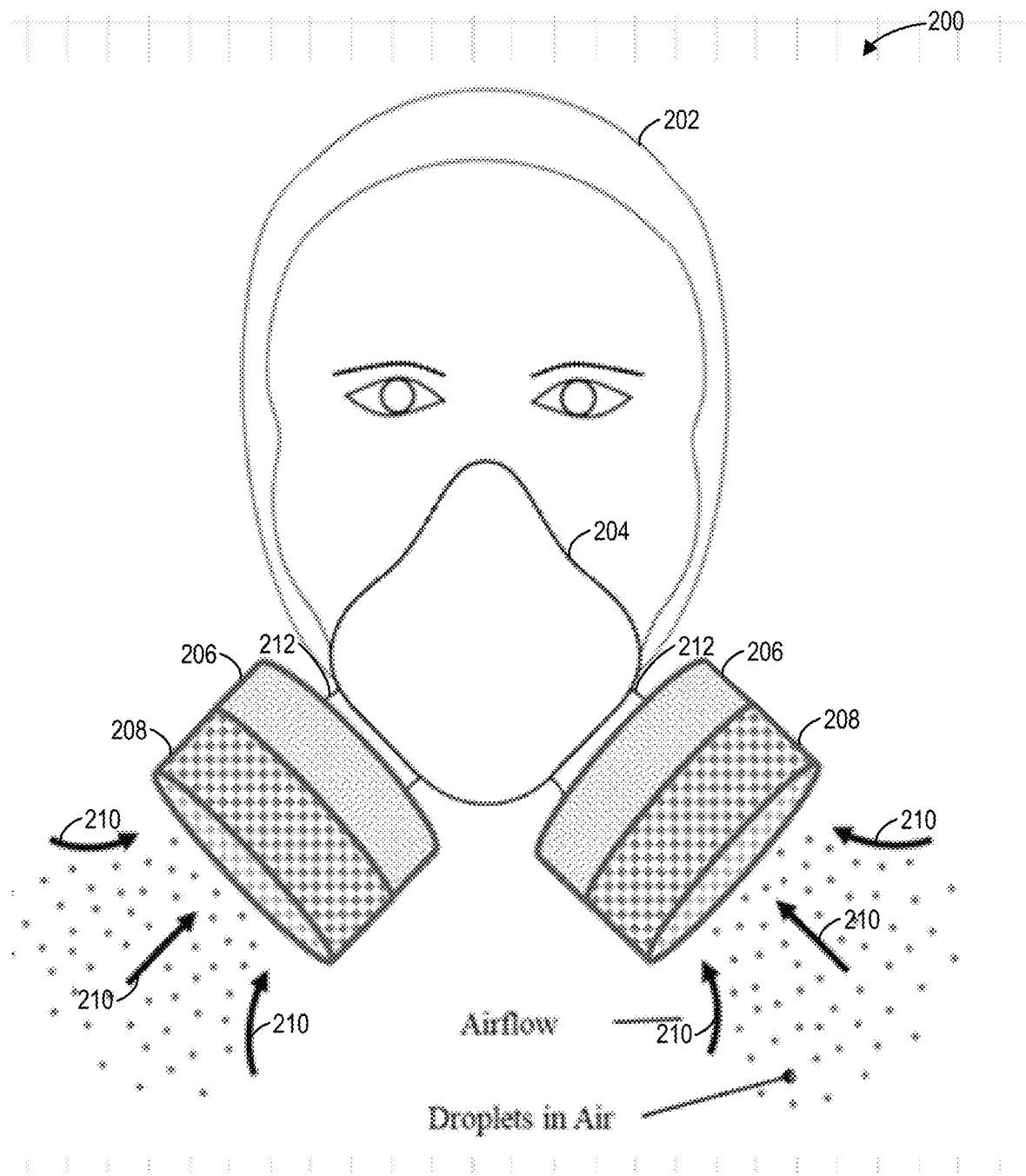
FIG. 2 shows an example of a respirator incorporating an inertial filter.
Figure 3:
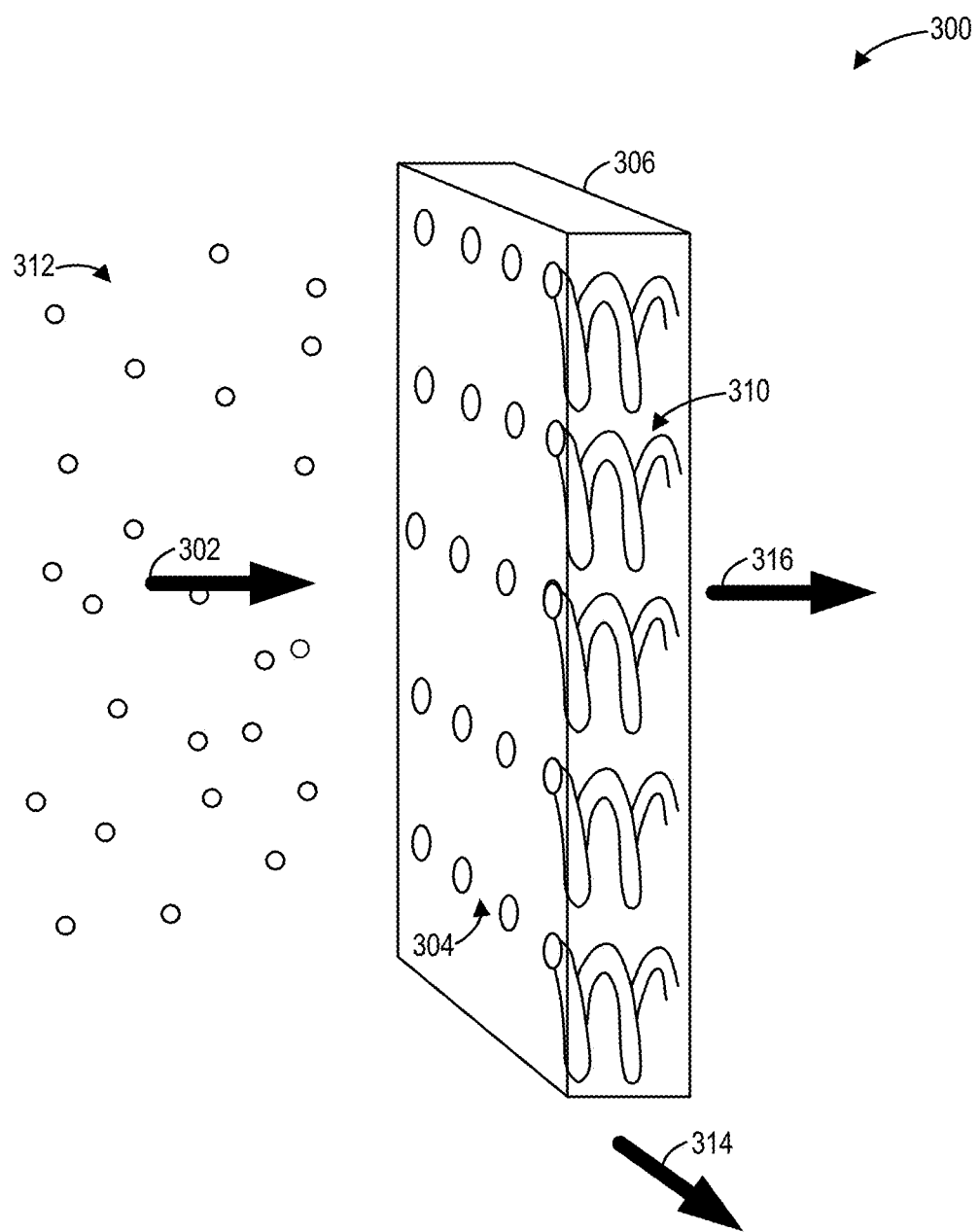
FIG. 3 shows a schematic example of an inertial filter with helical through-holes.

Turning now to FIG. 2, an example schematic of a respirator 200 with an inertial filter 208 is shown. For example, the respirator 200 may be used in space-based firefighting where the water droplets used to fight the fire are filtered out of the airstream entering the respirator. This prevents the water droplets from obstructing the respirator. By using the inertial filter 208, airflow can continue unobstructed, with low pressure drop, preventing droplet-induced blockage. Additionally, moisture inhalation may be reduced.

A user 202 may wear the respirator 200 with a face attachment 204 covering the mouth and nose of the user 202. A direction of an air flow (which may include liquid droplets) entering the respirator 200 is indicated by arrows 210. The air may flow into the inertial filter 208, and the liquid droplets may be filtered out of the air flow by helical patterns within the inertial filter 208, leaving the remaining air to be droplet-free. The droplet-free air may then enter a secondary filter 206. For example, the secondary filter 206 may be a particulate filter capable of capturing soot from a fire or other particulates that may increase a difficulty of breathing. The filtered air may then travel from the secondary filter through air passage ways 212 to enter the face attachment 204 for the user 202 to breathe in.

Turning now to FIG. 3, a perspective view of a section of a planar inertial filter 300 is shown. For example, the planar inertial filter 300 may be the inertial filter 112 within the filtering system 100 shown in FIG. 1 or the inertial filter 208 that is a part of the respirator 200 shown in FIG. 2. In some examples, the planar inertial filter 300 may be shaped as a cone, sphere, etc. The planar inertial filter 300 includes a plurality of helical through-channels 310 within a porous material 306 and with a plurality of entrance holes 304. Dimensions (e.g., length, width, diameter, etc.) of the plurality of helical through-channels 310 are larger than dimensions of pores of the porous material 306. As a result, the planar inertial filter 300 exploits inertial, capillary, and wetting forces to separate the gas, liquid or particles entering the planar inertial filter 300. The plurality of helical through-channels 310 are shown as a single helix, however, in other examples, the plurality of helical through-channels 310 may be configured as double or triple helices, as further elaborated with respect to FIGS. 4-6. The planar inertial filter 300 may be used to perform liquid-gas, solid-gas, and solid-liquid-gas phase separations for droplets/particles of a wide range of length-scales including centimeter to micrometer sizes. The planar inertial filter 300 additionally contains no moving parts, low pressure losses, a constant pressure drop, and no additional power consumption due to its passive separation method utilizing motive fluid streams. This may increase a reliability of the planar inertial filter 300.

A liquid/gas mixture 312, which may be a mixture of gas, liquid droplets, and/or particulates of a variety of diameters and diameter distributions may flow into the planar inertial filter 300 as indicated by an air flow arrow 302. For example, the air flow may be driven externally by a blower, fan, buoyancy, gravity, etc. The liquid/gas mixture 312 may enter through the plurality of entrance holes 304 and flow through the plurality of helical through-channels 310. Centrifugal accelerations drive the liquid of the liquid/gas mixture 312 to the outer walls of the plurality of helical through-channels 310 where droplets may impinge onto the porous material 306, which absorbs and may retain the droplets from the liquid/gas mixture 312. For example, the droplets and/or particles may spread and distribute within the porous material 306 by capillary forces, directing the droplets and/or particles away from the plurality of helical through-channels 310, which remain open to the gaseous air flow. A length and diameter of the plurality of helical through-channels 310 include a margin for developing flows, local recirculation, droplet rolling, and satellite droplet rebound. The length, diameter, and number of helical channels is selected to remain below pressure drop specifications. Although not shown in FIG. 3, the porous material 306 may incorporate drain vias, an example of which is shown in FIG. 12 and described below. In situations of high gravity (e.g., the surface gravity of the Earth), liquid within the porous material 306 may drain via gravity. In situations of low gravity (e.g., in space), the liquid within the porous material 306 may drain out of the porous material 306 through the drain vias, as indicated by the liquid drain arrow 314. In other examples, the impinged liquids and/or particulates may be stored within the porous material 306. As a further example, filtration through the planar inertial filter 300 may continue until the porous material 306 is saturated. In some examples, when the porous material is saturated, the inertial filter may be replaced. In other examples, such as the inertial filter 218 of FIG. 1, the inertial filter may be drained for continuous use. Gases from the air traveling through the plurality of helical through-channels 310 may exit the planar inertial filter 300 as indicated by a gas exit arrow 316. For example, the gas that exits may be free from liquid droplets and/or particles.

Figure 4:
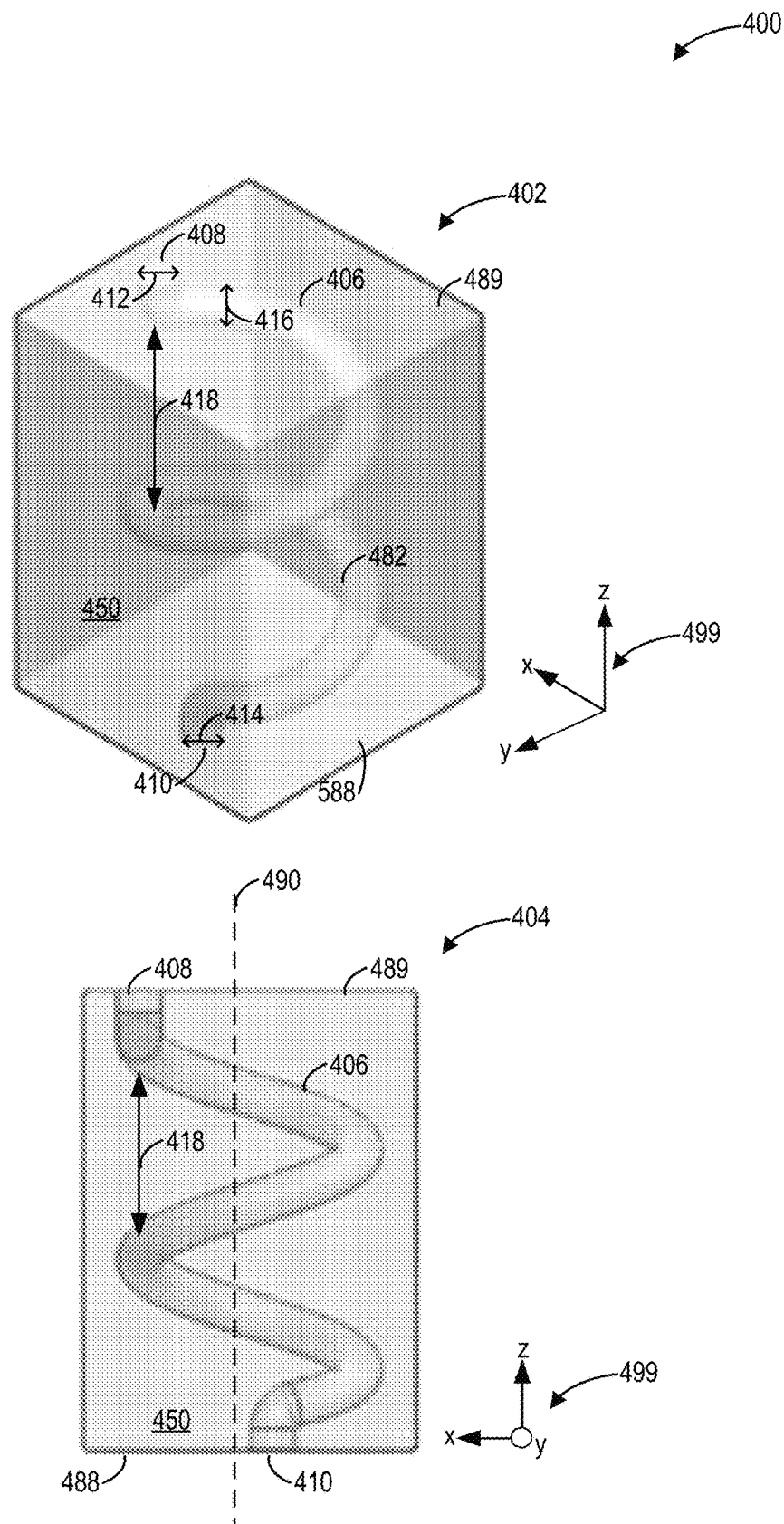
FIG. 4 shows an example of a single helix channel configuration.

Continuing now to FIG. 4, a single helix configuration 400 comprising one helical passage is shown in a perspective view 402 and in a side view 404. For example, the single helix configuration 400 may be implemented within the inertial filter 112 shown in FIG. 1 or the inertial filter 208 shown in FIG. 2. As a further example, the single helix configuration 400 is shown in FIG. 3. Reference axes 499 are included in both the perspective view 402 and side view 404 in order to compare the views and relative orientations described below. Reference axes 499 includes three axes, namely an x-axis, a y-axis, and a z-axis. A positive direction for each axis is indicated by an arrow. The positive direction of the y-axis points out of the page in the side view 404 as shown by a circle.

The single helix configuration 400 includes a helical passage 406 within a porous material 450. The helical passage 406 includes an entrance hole 408, an exit hole 410, and a pitch 418 (e.g., a height of one full helix turn, measured parallel to a central axis 490). The helical passage 406 includes the central axis 490, which is shown in the side view 404 and is parallel to the z-axis. In the example shown in FIG. 4, the helical passage 406 maintains an equal radial distance from the central axis 490 (e.g., a distance from the central axis parallel to an x-y plane of the reference axes 499). In other examples, the radial distance between the central axis 490 and the helical passage 406 may fluctuate about the central axis 490. For example, the radial distance for each turn may be different, or, as another example, the radial distance may be similar for some turns and different for others. As a further example, the radial distance may alternate between two or more different radii.

Additionally, the helical passage 406 is shown completing one and a half rotations where a rotation is a 360 degree turn; however, any number of rotations may be used. For example, the helical passage 406 may complete 1, 2, 3, or more rotations and the rotations may be full or partial (e.g., 0.25, 0.50, 0.75, etc.). More rotations or fewer rotations may be added or removed by changing the pitch 418 or by increasing a length the helical passage 406 within the porous material 450.

Furthermore, the helical passage 406 extends from the entrance hole 408 at a top surface 489 of the porous material 450 to the exit hole 410 at a bottom surface 488 of the porous material 450, forming a tubular void in the porous material 450. For example, the entrance hole 408 is a first opening defined by a circular edge on the top surface 489 meeting internal walls of the helical passage 406 and may not be obstructed with the porous material 450. Similarly, the exit hole 410 is a second opening defined by a circular edge on the bottom surface 488 meeting internal walls 482 of the helical passage 406 and may not be obstructed with the porous material 450. The helical passage 406 may be a fluidic passage with internal walls 482 passing through the porous material 450, but distinct from interstitial spaces of the porous material 450. The internal walls 482 are open to the porous material 450 via the porosity of the porous material 450. For example, the helical passage 406 is not a passage formed by the general porosity of the porous material 450.

In some embodiments, an entrance diameter 412 of the entrance hole 408 may be equal to a channel diameter 416 of the helical passage 406 and/or equal to an exit diameter 414 of the exit hole 410. As another example, the channel diameter 416 may be smaller than the entrance diameter 412 and the exit diameter 414 (e.g., the channel diameter 416 may taper out near the exit hole 410 and entrance hole 408).

A combination of liquids, gases, and/or solids may enter the helical passage 406, which may be a tubular void within the porous material, through the entrance hole 408. As the liquid, gases, and/or solids pass through the helical passage 406 the liquids and/or solids may impinge on and be absorbed and retained by the porous material 450. As such, liquids and/or solids may not exit through the exit hole 410, leaving gases to exit the helical passage 406 through the exit hole 410.

Figure 5:
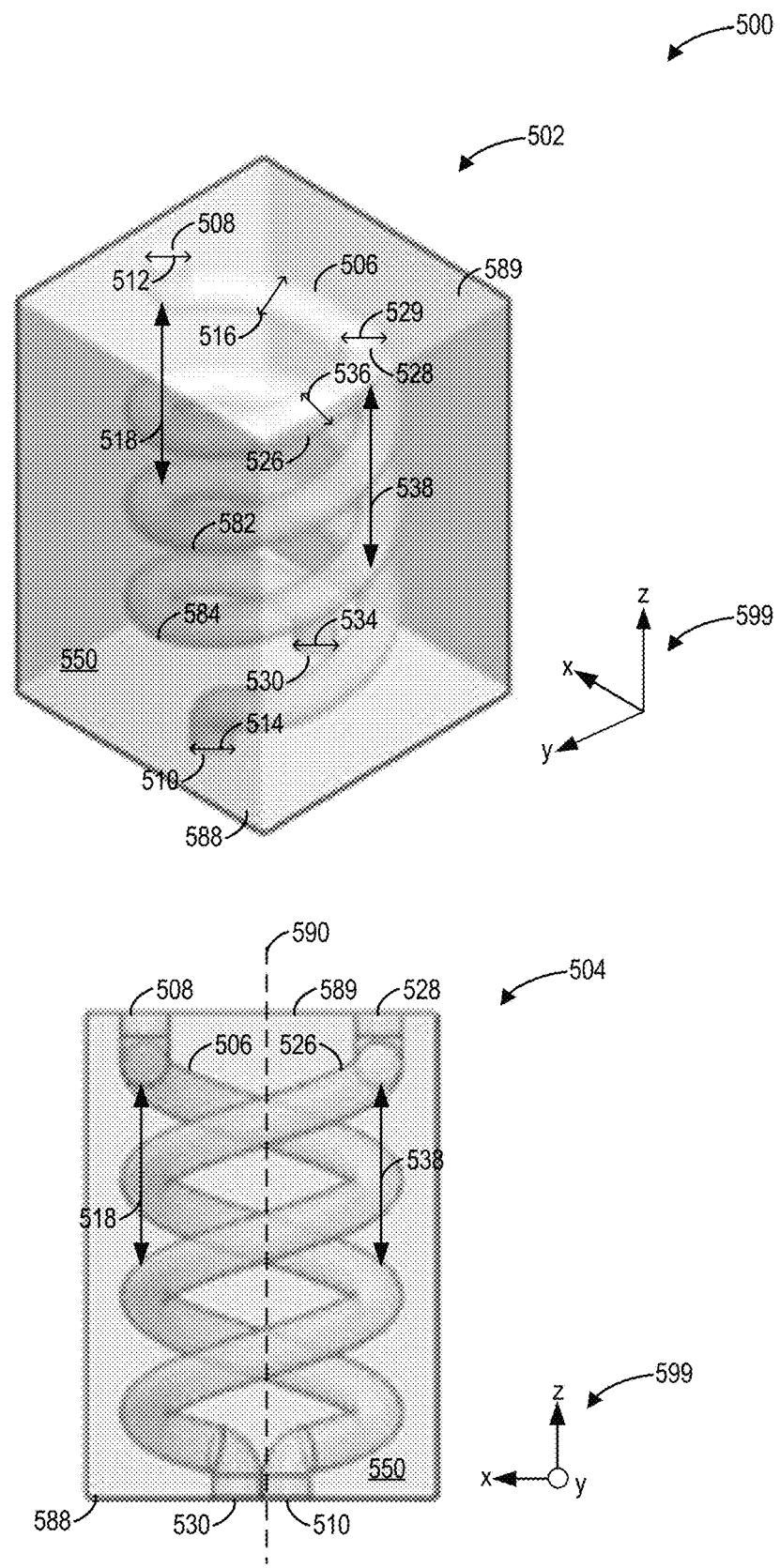
FIG. 5 shows an example of a double helix channel configuration.
Figure 6:
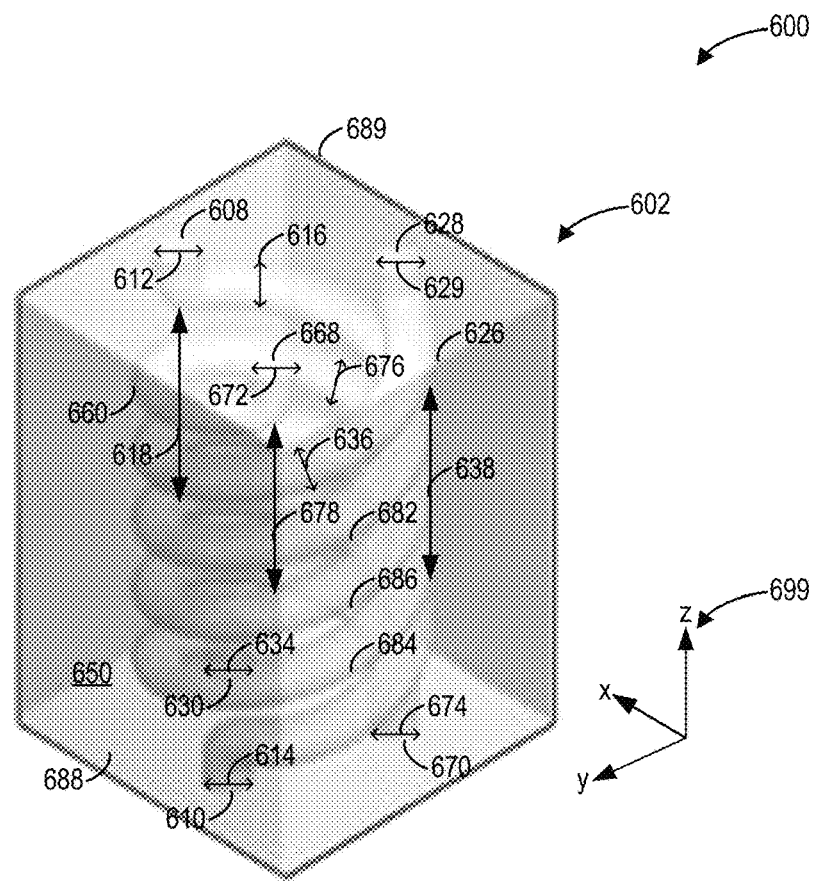
FIG. 6 shows an example of a triple helix channel configuration.
Figure 6:
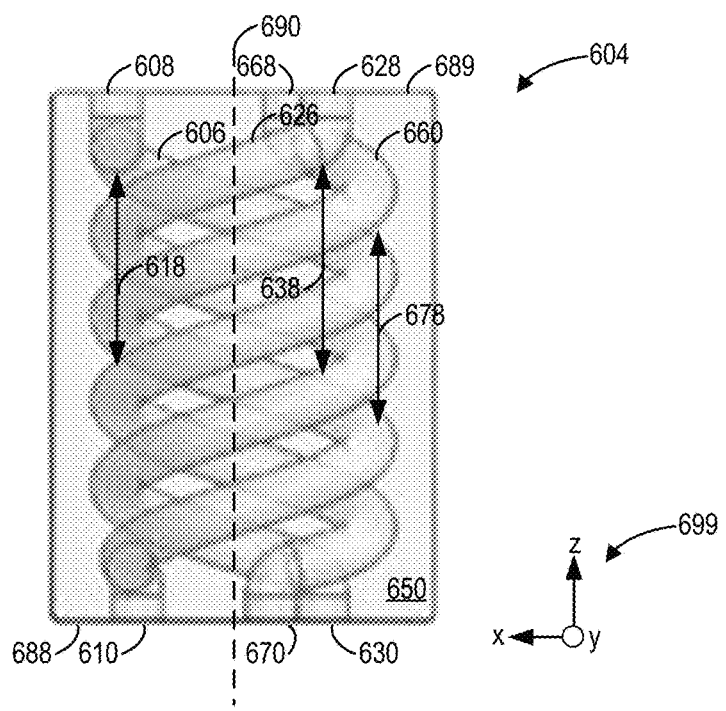

Turning now to FIG. 5, a double helix configuration 500 comprising two helical passages is shown in a perspective view 502 and in a side view 504. For example, the double helix configuration 500 may be implemented within the inertial filter 112 shown in FIG. 1 or the inertial filter 208 shown in FIG. 2. As a further example, the double helix configuration 500 may be used in an inertial filter in combination with the single helix configuration 400 of FIG. 4. For example, there may be alternating rows of the single helix configuration 400 and the double helix configuration 500, or, as another example, the single helix configuration 400 and the double helix configuration 500 may alternate one after the other such that similar configurations are not directly next to each other. Additionally, the double helix configuration 500 may be selected where increased flow per volume is desired instead of additional porous material to hold filtered liquids and/or solids. Reference axes 599 are included in both the perspective view 502 and side view 504 in order to compare the views and relative orientations described below. Reference axes 599 includes three axes, namely an x-axis, a y-axis, and a z-axis. A positive direction for each axis is indicated by an arrow. The positive direction of the y-axis points out of the page in the side view 504 as shown by a circle.

The double helix configuration 500 includes a first helical passage 506 with a first entrance hole 508, a first exit hole 510, and first pitch 518. The double helix configuration 500 additionally includes a second helical passage 526 with a second entrance hole 528, a second exit hole 530, and a second pitch 538. The first helical passage 506 and second helical passage 526 are shown twisting around a central axis 590, which is shown on the side view 504 and is parallel to the z-axis. As shown in the double helix configuration 500, the first helical passage 506 and the second helical passage 526 may maintain an equal radial distance away from the central axis 490. In other examples, the first helical passage 506 and/or the second helical passage 526 may fluctuate a radial distance away from the central axis 590 (e.g., a distance from the central axis parallel to an x-y plane of the reference axes 599). For example, the radial distance for each turn may be different, or, as another example, the radial distance may be similar for some turns and different for others. As a further example, the radial distance may alternate between two or more different radii.

Additionally, the first helical passage 506 and the second helical passage 526 are shown completing one and a half rotations where a rotation is a 360 degree turn, however, any number of rotations may be used. For example, the first helical passage 506 and the second helical passage 526 may complete 1, 2, 3, or more rotations, and the rotations may be complete or partial (e.g., 0.25, 0.50, 0.75, etc.). More rotations or less rotations may be added or removed by changing the first pitch 518 and the second pitch 538 and/or by increasing a length of the first helical passage 506 and the second helical passage 526 take up within a porous material 550.

Furthermore, the first helical passage 506 and second helical passage 526 may extend from a top surface 589 of the porous material 550 to a bottom surface 588 of the porous material 550. For example, the first entrance hole 508 and second entrance hole 528 may be first openings defined by a circular edge located on the top surface 589 and may not be obstructed with the porous material 550. Similarly, the first exit hole 510 and second exit hole 530 may be second openings defined by a circular edge located on the bottom surface 588 and may not be obstructed with the porous material 550. The first helical passage 506 and the second helical passage 526 may be fluidic passages with internal walls 582 and internal walls 584, respectively, passing through the porous material 550 but are distinct from interstitial spaces of the porous material 550. The internal walls 582 and internal walls 584 are open to the porous material 550 via the porosity of the porous material 550. For example, the first helical passage 506 and the second helical passage 526 are not passages formed by the general porosity of the porous material 550.

A first entrance diameter 512 of the first entrance hole 508 may be equal to a first channel diameter 516 of the first helical passage 506 and/or equal to a first exit diameter 514 of the first exit hole 510. As another example, the first channel diameter 516 may be smaller than the first entrance diameter 512 and the first exit diameter 514 (e.g., the first channel diameter 516 may taper out near the first exit hole 510 and the first entrance hole 508). A second entrance diameter 529 of the second entrance hole 528 may be equal to a second channel diameter 536 of the second helical passage 526 and/or equal to a second exit diameter 534 of the second exit hole 530. As another example, the second channel diameter 536 may be smaller than the second entrance diameter 529 and the second exit diameter 534. As a further example, some, all, or none of the first entrance diameter 512, first channel diameter 516, and first exit diameter 514, the second entrance diameter 519, second channel diameter 536, and second exit diameter 534 may be equal to each other.

As an additional example, the first pitch 518 and the second pitch 538 may be equal and sized such that the first helical passage 506 and the second helical passage 526 do not intersect. In this way, flow through the inertial filter may be increased for a given packing density. In situations of low gravity (e.g., in a space station), small volume items are desired. The double helix configuration 500 decreases an amount of linear space used for filtering, making it a desirable configuration for low gravity environments.

A combination of liquids, gases, and/or solids may enter the first helical passage 506 and the second helical passage 526, which both may be a void within the porous material, through the first entrance hole 508 and the second entrance hole 528 respectively. As the liquids, gases, and/or solids pass through the first helical passage 506 and the second helical passage 526, the liquids and/or solids may impinge on and be absorbed by the porous material 550. As such, liquids and/or solids may not exit through the first exit hole 510 nor the second exit hole 530, leaving gases to exit the first helical passage 506 through the first exit hole 510 and to leave the second helical passage 526 through the second exit hole 530.

Turning now to FIG. 6, a triple helix configuration 600 comprising three helical passages is shown in a perspective view 602 and in a side view 604. For example, the triple helix configuration 600 may be implemented within the inertial filter 112 shown in FIG. 1 or the inertial filter 208 shown in FIG. 2. As a further example, the triple helix configuration 600 may be used in an inertial filter in combination with the single helix configuration 400 of FIG. 4 and/or the double helix configuration 500 of FIG. 5. For example, there may be alternating rows of the single helix configuration 400, the double helix configuration 500, and/ or the triple helix configuration 600, or, as another example, the single helix configuration 400, the double helix configuration 500, and/or the triple helix configuration 600 may alternate one after the other. Additionally, the triple helix configuration 600 may be preferred over the double helix configuration 500 and the single helix configuration 400 where increased flow per volume instead of additional porous material to hold filtered liquids and/or solids is desired. Reference axes 699 are included in both the perspective view 602 and side view 604 in order to compare the views and relative orientations described below. Reference axes 699 includes three axes, namely an x-axis, a y-axis, and a z-axis. A positive direction for each axis is indicated by an arrow. The positive direction of the y-axis points out of the page in the side view 604 as shown by a circle.

The triple helix configuration 600 includes a first helical passage 606 with a first entrance hole 608, a first exit hole 610, and first pitch 618. The triple helix configuration 600 additionally includes a second helical passage 626 with a second entrance hole 628, a second exit hole 630, and a second pitch 638. Furthermore, a third helical passage 660 with a third entrance hole 668, a third exit hole 670, and a third pitch 678 is included within the triple helix configuration 600. The first helical passage 606, second helical passage 626, and third helical passage 660 are shown twisting around a central axis 690, which is shown on the side view 604 and is parallel to the z-axis. As shown in the triple helix configuration 600, the first helical passage 606, the second helical passage 626, and third helical passage 660 may maintain an equal radial distance away from the central axis 590. In other examples, the first helical passage 606, the second helical passage 626, or the third helical passage 660 may fluctuate a radial distance away from the central axis 690 (e.g., a distance from the central axis parallel to an x-y plane of the reference axes 699). For example, the radial distance for each turn may be different, or, as another example, the radial distance may be similar for some turns and different for others. As a further example, the radial distance may alternate between two or more different radii. Additionally, the first helical passage 606, second helical passage 626, and third helical passage 660 are shown completing one and a half rotations where a rotation is a 360 degree turn, however, any number of rotations may be used. For example, 1, 2, 3, or more rotations may be completed, and the rotations may be complete or partial (e.g., 0.25, 0.50, 0.75, etc.).

Furthermore, the first helical passage 606, the second helical passage 626, and the third helical passage 660 extend from a top surface 689 of the porous material 650 to a bottom surface 688 of the porous material 650. For example, the first entrance hole 608, the second entrance hole 628, and the third entrance hole 668 may be openings defined by a circular edge located on the top surface 689 and may not be obstructed with the porous material 650. Similarly, the first exit hole 610, the second exit hole 630, and the third exit hole 670 may be defined by a circular edge located on the bottom surface 688 and may not be obstructed with the porous material 650. The first helical passage 606 includes internal walls 682, the second helical passage 626 includes internal walls 684, and the third helical passage 660 includes internal walls 686. The internal walls 682, internal walls 684, and internal walls 686 may be open to the porous material 650 via the porosity of the porous material 650. For example, the first helical passage 606, the second helical passage 626, and the third helical passage 660 are not passages formed by the general porosity of the porous material 650.

A first entrance diameter 612 of the first entrance hole 608 may be equal to a first channel diameter 616 of the first helical passage 606 and/or equal to a first exit diameter 614 of the first exit hole 610. As another example, the first channel diameter 616 may be smaller than the first entrance diameter 612 and the first exit diameter 614. A second entrance diameter 629 of the second entrance hole 628 may be equal to a second channel diameter 636 of the second helical passage 626 and/or equal to a second exit diameter 634 of the second exit hole 630. As another example, the second channel diameter 636 may be smaller than the second entrance diameter 629 and the second exit diameter 634. A third entrance diameter 672 of the third entrance hole 668 may be equal to a third channel diameter 676 of the third helical passage 660 and/or equal to a third exit diameter 674 of the third exit hole 670. As another example, the third channel diameter 676 may be smaller than the third entrance diameter 672 and the third exit diameter 674. As a further example, all, some or none of the third entrance diameter 672, the third channel diameter 676, and the third exit diameter 674, the first entrance diameter 612, first channel diameter 616, and first exit diameter 614, and the second entrance diameter 619, second channel diameter 636, and second exit diameter 634 may be equal.

As an additional example, the first pitch 618, the second pitch 638, and the third pitch 678 may be equal such that the first helical passage 606, the second helical passage 626, and the third helical passage 660 do not intersect. In this way, flow through the inertial filter may be increased for a given packing density. In situations of low small volume items are desired (e.g., in a space station), the triple helix configuration 600 decreases an amount of linear space desired for filtering while increasing a flow through the inertial filter, which may increase an amount filtered for a given time period.

A combination of liquid, gases, and/or solids may enter the first helical passage 606 through the first entrance hole 608, enter the second helical passage 626 through the second entrance hole 628, and enter the third helical passage 660 through the third entrance hole 668. As the liquid, gases, and/or solids pass through the first helical passage 606, the second helical passage 626, and the third helical passage 660 the liquids and/or solids may impinge on and be absorbed by the porous material 650. As such, liquids and/or solids may not exit through the first exit hole 610, the second exit hole 630, nor the third exit hole 670, leaving gases to exit the first helical passage 606 through the first exit hole 610, exit the second helical passage 626 through the second exit hole 630, and exit the third helical passage 660 through the third exit hole 670.

Figure 7:
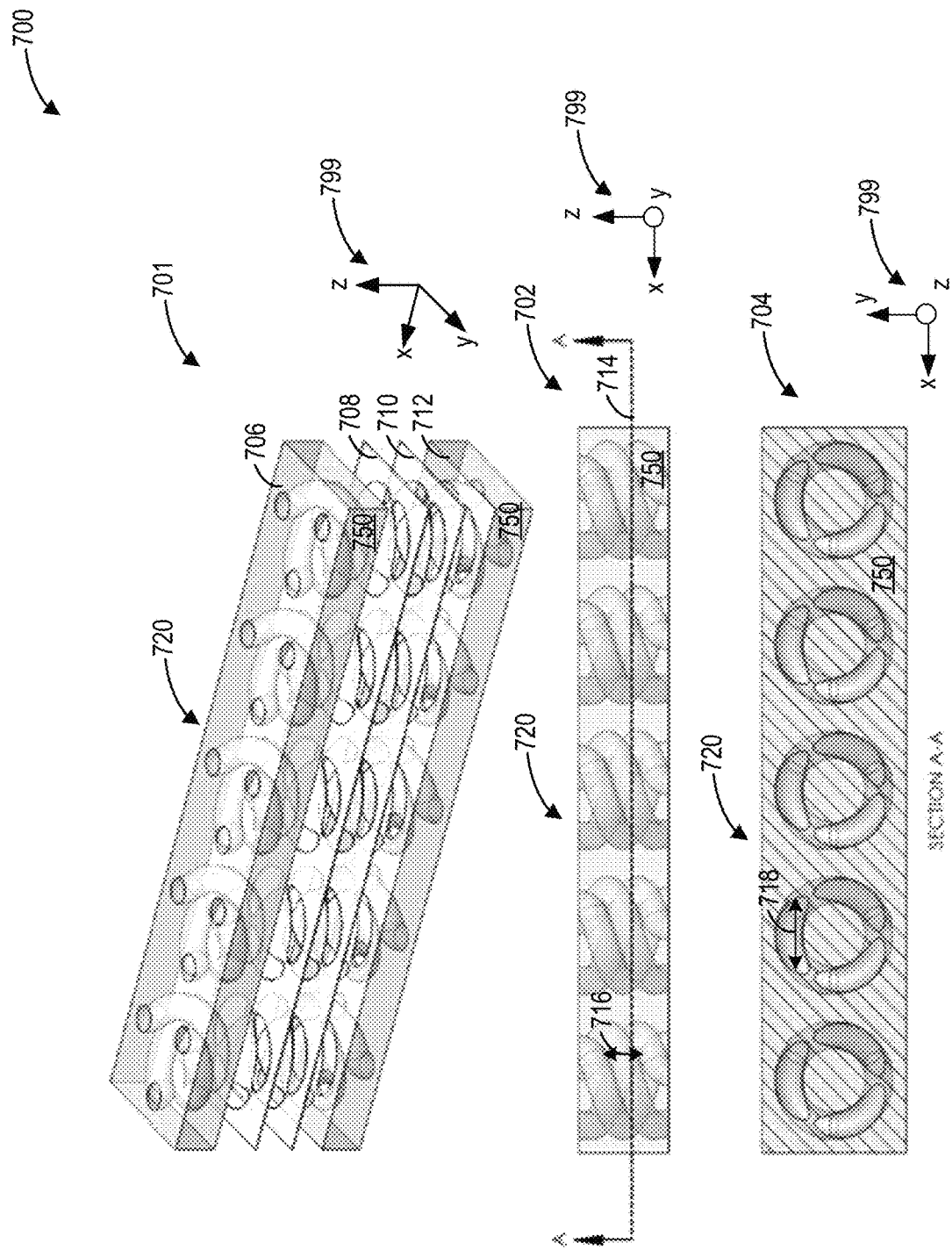
FIG. 7 shows an array of triple helix channel configurations in an exploded view, a side view, and a cross-sectional view.
Figure 8:
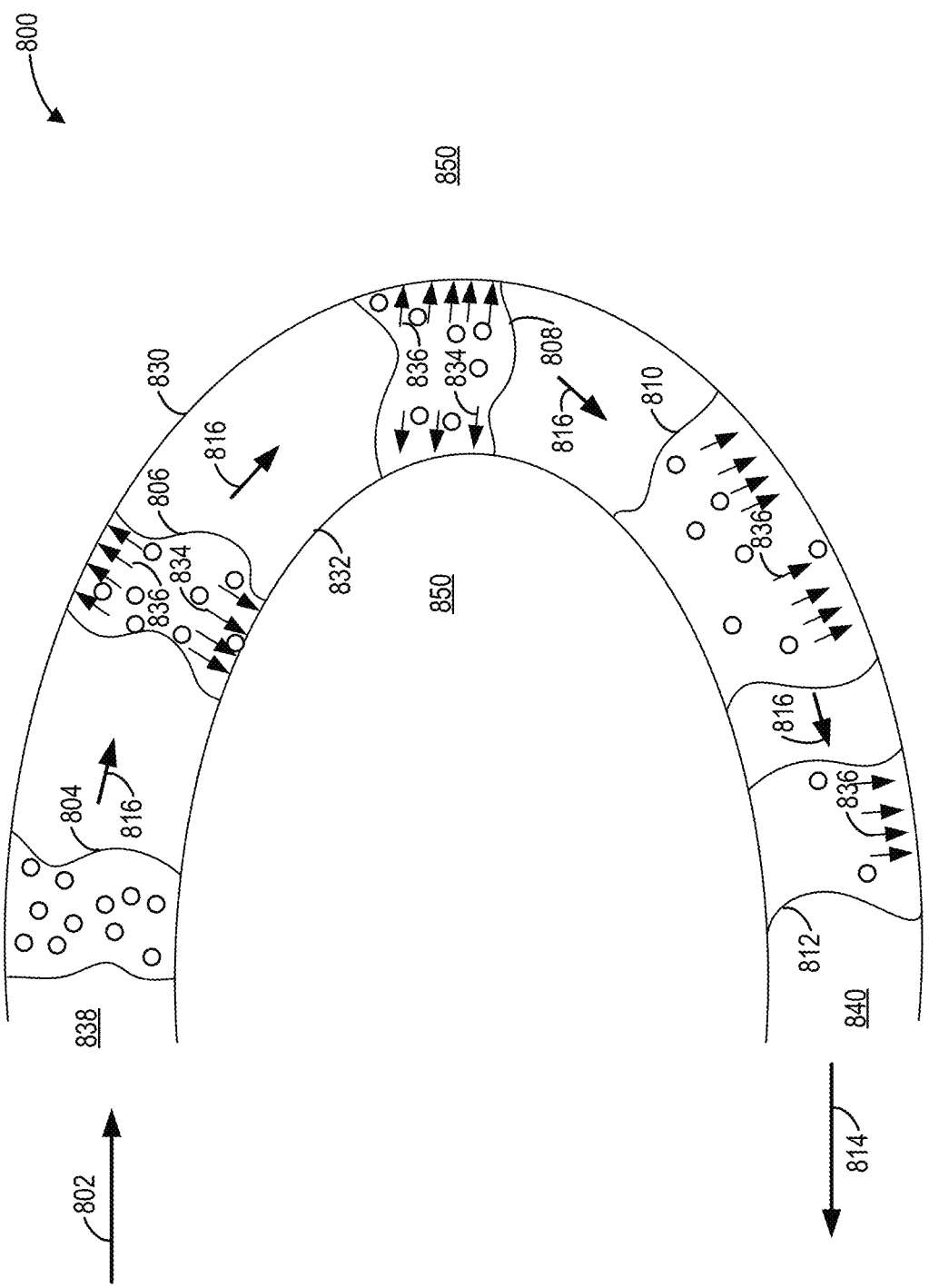
FIG. 8 shows a development of fluid flow through a curved path.

FIG. 7 shows an array 700 of a plurality of helical passage units 720 (e.g., helical passages that may be in a single, double, or triple helix configuration) that may be within a planar inertial filter. The array 700 is shown in an exploded view 701, a side view 702, and a cross-sectional view 704. The exploded view 701 shows a first 3D volume 706, a first cross-section 708, a second cross-section 710, and a second 3D volume 712. The array 700 may be a section of the inertial filter 112 of the filtering system 100 shown in FIG. 1 or a section of the inertial filter 208 shown in FIG. 2. Reference axes 799 are included in all views in order to compare the views and relative orientations described below. Reference axes 799 includes three axes, namely an x-axis, a y-axis, and a z-axis. A positive direction for each axis is indicated by an arrow. The positive direction of the y-axis points out of the page in side view 702 as shown by as the circle, and the positive direction of the z-axis points out of the page in the cross-sectional view 704.

The helical passage units 720 are shown within a planar porous material 750 and are examples of the triple helix configuration 600 shown in FIG. 6. In other examples, the array 700 of helical passage units 720 may be the single helix configuration 400 shown in FIG. 4, the double helix configuration 500 shown in FIG. 5, or a mixture of two or more of the helix configurations. The array 700 is shown as one row with five helical passage units 720 and 15 (e.g., five sets of triple helical configurations) helical passage units 720, however, within the inertial filter, there may be a plurality of rows with more or fewer helical passage units 720. For an example, an inertial filter may include an amount of rows between 1 to 5, 5 to 10, 15 to 20, 20 to 50, or more. The helical passage units may be arranged in an array with equal dimensions within the inertial filter to form a square filter or may have unequal dimensions to form a rectangular filter. In other examples, the helical passage units 720 may be arranged in a circle, spiral, or oblong shape to fit packaging desires for the inertial filter. The amount of helical passage units 720 within an inertial filter may depend on the amount of rows and the helical configuration (e.g., packing density) of the helical passage units 720. Additionally, the helical passage units 720 may be interwoven or overlapped in tighter arrays to increase media porosity. As a further example, the helical passage units 720 may alternate from right handed thread and left handed thread for net flow uniformity.

The side view 702 includes a cross-sectional line 714 parallel to the x-axis to show where the cross-sectional view 704 originates in the array 700 of the helical passage units 720. Furthermore, in the side view 702, a pitch 716 parallel to the z-axis is shown. In the example of the array 700, the helical channels all have an equal pitch 716, however, in other examples, the helical channels may have unequal pitches. The pitch 716 is shown as an example of a smaller pitch than is shown in FIGS. 4, 5, and 6, and as a result, the helical passage units 720 are more tightly packed, but still not overlapping. In this way, the flow through a packing density of the inertial filter may be increased.

The cross-sectional view 704 shows the horizontal cross sections of a triple helix (e.g., three non-touching kidney shaped holes) from the cross-sectional line 714. A length 718 of one helical channel is shown. In the example array 700, the length 718 may be equal for all the helical channels. In other examples, such as when a pitch of the helical channels is unequal or a radial distance from a center axis is unequal the length 718 may not be equal for all helical channels. As another example, the length 718 may increase with a smaller pitch or decrease with a larger pitch.

Turning now to FIG. 8, the development of fluid flow around a curved path 800 is shown. The curved path 800 may be a section of a helical path (e.g., helical passage). The development of fluid flow includes liquid drift, impact (e.g., impingement), and capillary absorption. The fluid flow development around the curved path 800 is an example of the development of fluid flow within an inertial filter with helical channels. As a further example, the fluid flow development of the curved path 800 may be included in the inertial filter 112 of FIG. 1 and the inertial filter 208 of FIG. 2. The fluid flow is shown in different sections throughout the curved path 800. For example, the fluid flow includes a first section that is a disperse flow section 804, a second section that is a partially developed annular flow section 806, a third section that is a partially developed asymmetric annular flow section 808, a fourth section that is a more fully developed annular flow section 810, and a fifth section that is fully developed annular flow with fully caught liquid section 812. Although only the above-mentioned sections are explicitly illustrated, it may be understood that development of fluid flow acts in a similar way at the boundary of each illustrated section and/or may be transitioning between two different sections proximate to each other. For example, between the partially developed asymmetric annular flow section 808 and the fully developed annular flow section 810, which are proximate to each other, the fluid flow may be continuously or abruptly changing from, as an example, the partially developed asymmetric annular flow to fully developed annular flow. Further, the annular flow film thickness may be regulated by the liquid wicking rate into the porous media.

A liquid/gas mixture 802 enters the curved path 800 at an entrance 838. The liquid/gas mixture 802 may be a combination of gas and liquid. For example, the air may be a 90:10 ratio of gas to liquid, or, in other examples, the ratio of gas to liquid may be 85:15, 95:5, or 99:1. As the liquid/gas mixture 802 enters, the fluid flow is that of the disperse flow section 804. The fluid flow may continue farther in a direction shown by direction arrows 816 through the curved path 800.

At the partially developed annular flow section 806, centrifugal forces within the curved path 800 cause liquids within the liquid/gas mixture 802 to impinge on an outer wall 830 and an inner wall 832, as shown by outer impingement arrows 836 and inner impingement arrows 834. As the liquid impinges on the outer wall 830 and inner wall 832, the liquid is absorbed by a porous material 850. Through capillary action, the porous material may flow the absorbed liquid away from the curved path 800 to allow further capture of liquid. Due to liquid within the liquid/gas mixture 802 being absorbed by the porous material 850, the ratio of gas to liquid may increase. The liquid/gas mixture 802 may then continue farther through the curved path 800 as shown by the direction arrows 816 and reach the partially developed somewhat asymmetric annular flow section 808. Once fluid has developed to the partially developed asymmetric annular flow section 808, more liquid may impinge on the outer wall 830 than the inner wall 832, as shown by the decreased amount of inner impingement arrows 834 and increased outer impingement arrows 836.

The ratio of gas to liquid of the liquid/gas mixture 802 may further increase as more liquid is being absorbed within the partially developed asymmetric annular flow section 808 and at a transitionary area between the partially developed asymmetric annular flow section 808 and the fully developed annular flow section 810. Liquid within the fully developed annular flow section 810 may be impinging mostly or fully on the outer wall 830 as shown by the outer impingement arrows 836. The impinging liquid gets caught and absorbed by the porous material 850 such that the ratio of gas to air is further increased. The liquid/gas mixture 802 continues through the curved path 800, with liquid continuing to be absorbed, reaching the fully developed annular flow with fully caught liquid section 812, at which section the fluid flow is fully developed annular flow, similar to the fully developed annular flow section 810, however, the liquid in the fully developed annular flow with fully caught liquid section 812 is almost fully or is fully captured and absorbed in the porous material. In this way, an exiting air 814 may be approximately 100% gas.

Figure 9:
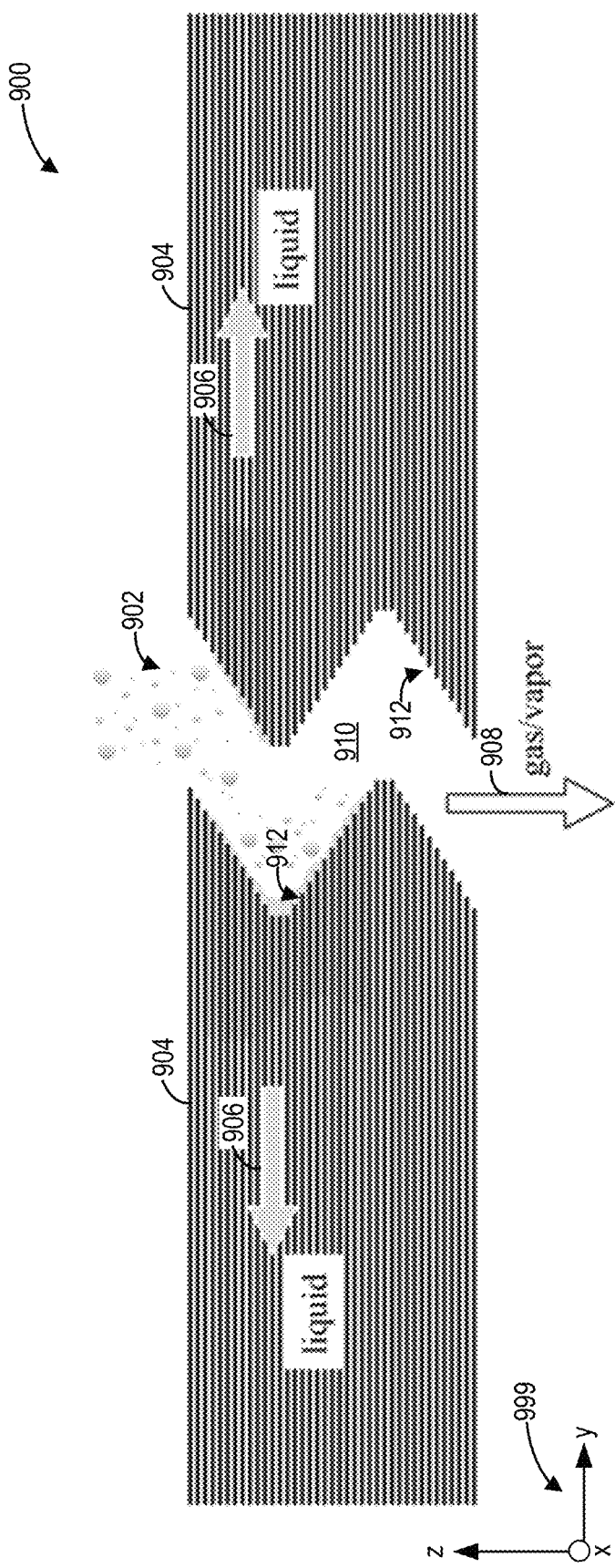
FIG. 9 shows a diagram of fluid flow through a porous material of an inertial filter.

Referring now to FIG. 9, a section of an inertial filter 900 shows movement of liquid through a helical channel 910 and a planar porous material 904. For example, the helical channel 910 may be any of the helical channel examples shown in FIGS. 4-6. The inertial filter 900 may be a part of the inertial filter 112 shown in FIG. 1 and/or the inertial filter 208 shown in FIG. 2. Reference axes 999 includes three axes, namely an x-axis, a y-axis, and a z-axis. A positive direction for each axis is indicated by an arrow. The positive direction of the x-axis points out of as shown by a circle.

Liquid droplets 902 may enter the helical channel 910, which is a tubular void extending from a top surface of the planar porous material 904 to a bottom surface of the planar porous material 904, and be driven to outer surfaces 912 where the liquid droplets impact, adhere, and are wicked into the planar porous material 904 parallel to the y-axis at a known rate based on the fluid properties, pore size and droplet flow rate. The liquid droplets 902 may then spread to the surrounding planar porous material 904 through capillary action in the direction of fluid flow arrows 906. As a result of the liquid moving through the porous material away from the helical channel 910, room is made for incoming liquid droplets 902. By using the helical channel design and liquid wicking properties of the planar porous material 904, the helical passageways remain open to the gas flow such that there remains a low pressure drop throughout the inertial filter 900, which works for filtering in environments where low volume and low pressure drop is desired, such as in low-gravity environments aboard spacecraft. For example, the filter pressure drop remains constant until the planar porous material 904 is fully saturated. If the planar porous material 904 is fully saturated, the liquid may be blown out, for example, via an air flow introduced into the planar porous material 904, to a draining location (e.g., at a back side of the inertial filter 900). Draining vias, which are shown in FIG. 10 and explained in greater detail below, may be added to operate in a steady drain mode resulting in the pressure drop to remain constant provided the droplet capture rate does not exceed the liquid drain rate from the draining vias.

FIG. 10 shows an exploded view 1000, an angled view 1002, a top view 1004, and a side view 1006 of a filter assembly 1099. The filter assembly 1099 comprises a 3D printed (3DP) filter 1010 made of absorbent material and helical channels 1016, a top plate 1008, and a bottom plate 1012. The top plate 1008 and the bottom plate 1012 may herein be referred to as a filter housing when combined to hold the 3DP filter 1010, as shown in the angled view 1002, the top view 1004, and the side view 1006. For example, the filter housing and the 3DP filter 1010 may be implemented in the filtering system 100 shown in FIG. 1. The filter housing may hold the 3DP filter 1010 in place so that movement of the filter is decreased. For example, the 3DP filter 1010 may be contained within the filter housing.

Reference axes 1098 are included in all views in order to compare the views and relative orientations described below. Reference axes 1098 includes three axes, namely an x-axis, a y-axis, and a z-axis. A positive direction for each axis is indicated by an arrow. The positive direction of the z-axis points out of the page in the top view 1004 as shown by as the circle, and the positive direction of the x-axis points out of the page in the side view 1006.

The top plate 1008 is shaped as a square or rectangle and has a length 1031 parallel to the y-axis and a width 1033 parallel to the x-axis. The length 1031 may be equal to, greater than, or smaller than the width 1033. In the example shown in FIG. 10, the length 1031 and the width 1033 are equal, creating a square shape. Indents on each side of the top plate 1008 are included such that each of the four corners protrude compared to the sides. An indentation length 1030

(e.g., a length of the indentation parallel to the length 1031) is shown in the exploded view 1000 along with an indentation width 1032 (e.g., a length of the indentation parallel to the width 1033). The indentation length 1030 is smaller than the length 1031, and the indentation width 1032 is smaller than the width 1033. In some examples, the indentation length 1030 may be equal to the indentation width 1032. In other examples, such as when the length 1031 and the width 1033 are not equal, the indentation length 1030 may not be equal to the indentation width 1032. The top plate 1008 also contains a lattice structure 1014 with some lattices parallel to the y-axis and some parallel to the x-axis which may be able to hold the filter in place while not blocking entrances and/or exits (e.g., the top plate 1008 may be in contact with either the entrances or the exits) to the helical channels 1016 (e.g., helical passages) on the 3DP filter 1010.

The helical channels 1016 are shown arranged in a porous material 1050 in an array with rows of alternating amounts of triple helix configurations (e.g., the triple helix configuration 600 shown in FIG. 6) on the 3DP filter 1010. For example, a first row shows 6 of the triple helix configurations, while a second row shows 7 triple helix configurations, repeating this pattern 3.5 more times. In other examples, each row may contain equal amounts of helical channels 1016. In other examples still, the helical channels 1016 may not be arranged in rows and instead in concentric circles, spirals, etc. Furthermore, the helical channels 1016 may instead be configured as a single helix (e.g., the single helix configuration 400 shown in FIG. 4), as double helices (e.g., the double helix configuration 500 shown in FIG. 5), a combination of the three configurations, or other overlapping, interwoven, or counter rotating configurations. In some embodiments, different configurations of helices may be combined in the 3DP filter 1010. For example, a first portion of the 3DP filter 1010 (e.g., at a center of the 3DP filter 1010) may include helices in a first configuration, a second portion of the 3DP filter 1010 (e.g., at a periphery of the 3DP filter 1010) may include helices in a second configuration, and so on.

The 3DP filter 1010 may exhibit a multi-scale porosity: a large-scale helical pore (e.g., the helical channels 1016) for low-resistance air flow and a small-scale pore (e.g., the porous material 1050) for wetting and holding of separated liquid droplets. In some embodiments, the porosity of the porous material 1050 may vary across the 3DP filter 1010. For example, a first portion of the porous material 1050 may include a first small-scale pore, a second portion of the porous material 1050 may include a second small-scale pore, and so on.

The 3DP filter 1010 may be printed of any variety of metallic, polymeric, or other synthetic or natural material. Material selection may be made broadly on filter objectives, performance requirements, and material compatibility. Poorly wetting materials may be accommodated by procedure; such as by prewetting/saturating the media with the test liquid before operation. As described in greater detail below, the 3DP filter may also be printed with an open cavity within which incremented layers (stacks) of perforated porous metallic, polymeric, or other synthetic or natural material fabric sheets are laid creating the parallel helical passageways described herein.

The bottom plate 1012 has a length 1046 parallel to the y-axis and a width 1048 parallel to the x-axis. The length 1046 may be equal to the length 1031 of the top plate 1008 and the width 1048 may be equal to the width 1033 of the top plate such that when the top plate 1008 and the bottom plate 1012 are in contact with each other (as shown in the angled view 1002, the top view 1004, and the side view 1006) the top plate 1008 does not extend past the bottom plate 1012 nor does the top plate 1008 fit inside the bottom plate 1012. The bottom plate 1012 has a height 1052 parallel to the z-axis, which may be sized to accommodate a height 1054 of the 3DP filter 1010 within the bottom plate 1012. A length 1036 of the 3DP filter 1010 may be smaller than the length 1046 of the bottom plate 1012, and a width 1034 of the 3DP filter 1010 may be smaller than the width 1048. However, an interior length 1040 of the bottom plate 1012 may be equal to the length 1036 of the 3DP filter 1010 along with an interior width 1038 of the bottom plate 1012 may be equal to the width 1034 of the 3DP filter 1010. As such, the 3DP filter 1010 may fit within the bottom plate 1012 with sides 3DP filter 1010 touching interior walls of the bottom plate 1012, which may promote stability and decrease movement of the 3DP filter 1010. The differences between the length 1046 and interior length 1040 is attributed to a thickness 1056 of the housing. The thickness 1056 accounts also for the differences between the width 1048 and interior width 1038. The bottom plate 1012 also includes a lattice structure 1020 at an opposite end of the top plate 1008, which may be able to hold the filter in place while not blocking entrances and/or exits (e.g., the bottom plate 1012 may be in contact with either the entrances or the exits) to helical channels 1016 on the 3DP filter 1010.

A top surface 1060 of the bottom plate 1012 contain protrusions 1058. Protrusions 1058 parallel to the length 1046 of the bottom plate 1012 may have a length 1042 which is equal to the indentation length 1030 of the top plate 1008. Additionally, protrusions parallel to the width 1048 have a width 1044 which is equal to the indentation width 1032 of the top plate 1008. As such the protrusions 1058 of the bottom plate 1012 may fit within the indentations of the top plate 1008 (shown in the angled view 1002, top view 1004, and side view 1006) using friction to couple the bottom plate 1012 and the top plate 1008. Furthermore, the top plate 1008 and the bottom plate 1012 may form a flush surface when coupled. In this way the housing may hold the 3DP filter 1010 in place.

Continuing now to FIG. 11, an exploded view 1100 of a filter assembly 1199 is shown. The filter assembly 1199 includes the top plate 1008, a layered filter 1106, and the bottom plate 1012. The top plate 1008 and the bottom plate 1012 are described above with respect to FIG. 10 and will not be re-introduced. The layered filter 1106 may fit within the bottom plate 1012 in a similar way as described with the 3DP filter 1010 shown in FIG. 10. In this example, the layered filter 1106 is shown in an exploded view with a plurality of laminated sheets 1108 separate from a main mass 1110. Reference axes 1198 includes three axes, namely an x-axis, a y-axis, and a z-axis. A positive direction for each axis is indicated by an arrow.

The layered filter 1106 may be a stack layup of wetting paper/filter media that, once aligned, forms helical pores (e.g., helical channels 1016) and provides a means to hold separated liquid via wicking and absorption. The layered filter 1106 may be a thin material comprised of, for example, a combination of Rayon and polyester that is readily wettable by water. To create the helical pores on a lay of the layered filter 1106, laser cutting may be used. One advantage of using laser cutting is that it may not use upfront tooling and can adapt to any geometry by simply changing a graphic file used for giving instructions to the laser cutter (as opposed to producing a new tool). As another example, a die punch for each layer may be created and combined together to make a single tool, decreasing filter production time.

Turning now to FIG. 12, an example assembly 1200 of an inertial filter is shown in an angled view 1202 and an exploded view 1203. In some examples of inertial filters, absorbent materials can be added to a rigid 3DP filter structure to enhance draining. This creates a mechanism to continuously separate, filter, and drain liquids indefinitely. A layered laminated version (not 3DP) can also be constructed by adding structures or layers that promote directional draining. The assembly 1200 includes a helix material 1204, drain connectors 1208, a parallel porous material 1212 (e.g., parallel to the drain connectors 1208) and a perpendicular porous material 1214 (e.g., perpendicular to the drain connectors 1208), and draining vias 1218. The perpendicular porous material 1214 may be the same as the parallel porous material 1212, or the parallel porous material 1212 may be different from the parallel porous material 1212. The assembly 1200 may be used in the inertial filter 112 shown in FIG. 1. Reference axes 1299 includes three axes, namely an x-axis, a y-axis, and a z-axis. A positive direction for each axis is indicated by an arrow.

The helix material 1204 may have a flow of air, which may include gases and liquids, through helical passages on the helix material 1204. The helix material may separate the liquid and gases in the air using centrifugal (e.g., inertial) forces to push the liquid to the sides of the helical passages and be absorbed by the parallel porous material 1212. The drain connectors 1208 may be coupled to the helix material 1204 on opposite sides (e.g., sides that are parallel to each other) of the helix material 1204. The drain connectors 1208 may be located parallel to the draining vias, which are used to transport liquid flow from the parallel porous material 1212 to the perpendicular porous material 1214. The drain connectors 1208 may then collect and drain liquid from the perpendicular porous material 1214. As an example, a single droplet of liquid may enter the helix material 1204 via a helical passage, and may be driven to impinge upon a portion of porous material on an interior surface of the helical passage. The droplet may be drawn to a nearest draining via 1218 lined with the parallel porous material 1212 (e.g., via capillary action). The droplet may then be drawn down the parallel porous material 1212 lining the draining via 1218 until reaching the perpendicular porous material 1214. Finally, the droplet may be drawn towards a center of the perpendicular porous material 1214 at a location of a drain connector 1208, where the liquid may be drained out of the filter assembly 1200.

In this way, an inertial filter including helical passages within a porous material may perform liquid-gas, solid-gas, and solid-liquid-gas phase separations for droplets/particles of a wide range of length-scales including centimeter to micrometer sizes. Furthermore, the inertial filter advantageously has no moving parts, low pressure losses, constant pressure drop, and no additional power consumption due to its passive separation method utilizing motive fluid streams, geometric flow components, and capillary (wicking) forces.

FIGS. 1, 4-7, and 10A-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for an inertial filter, comprising, a porous material, and an array of helical passages, each helical passage of the array of helical passages extending from a top surface of the porous material to a bottom surface of the porous material. In a first example of the system, the array of helical passages comprises a plurality of helical passage units, each helical passage unit of the plurality of helical passage units including a central axis extending from the top surface of the porous material to the bottom surface of the porous material. In a second example of the system, optionally including the first example, each helical passage unit of the plurality of helical passage units comprises at least one helical passage extending along the central axis, the at least one helical passage forming a helical path about the central axis from a first opening in the top surface of the porous material to a second opening in the bottom surface of the porous material. In a third example of the system, optionally including one or both of the first and second examples, each helical passage unit of the plurality of helical passage units comprises one helical passage extending along the central axis from the top surface of the porous material to the bottom surface of the porous material. In a fourth example of the system, optionally including one or more or each of the first through third examples, each helical passage unit of the plurality of helical passage units comprises two helical passages extending along the central axis from the top surface of the porous material to the bottom surface of the porous material. In a fifth example of the system, optionally including one or more or each of the first through fourth examples, each helical passage unit of the plurality of helical passage units comprises three helical passages extending along the central axis from the top surface of the porous material to the bottom surface of the porous material. In a sixth example of the system, optionally including one or more or each of the first through fifth examples, the porous material is configured to absorb and/or retain and/or transport liquid, but generally not gas. In a seventh example of the system, optionally including one or more or each of the first through sixth examples, the system further comprises: draining vias within the porous material. In a eighth example of the system, optionally including one or more or each of the first through seventh examples, the porous material is comprised of a plurality of laminated sheets of absorbent material. In a ninth example of the system, optionally including one or more or each of the first through eighth examples, the porous material is comprised of a single 3D printed monolith. In a tenth example of the system, optionally including one or more or each of the first through ninth examples, helical passages within the helical passage unit comprise at least one of overlapped helical passages, interwoven helical passages, right handed tread helical passages, or left handed tread helical passages.

The disclosure also provides support for a method comprising: flowing a gas, a liquid, and/or a solid through a planar inertial filter having helical passages within a porous material. In a first example of the method, flowing the gas, the liquid, and/or the solid through the planar inertial filter having helical passages within the porous material further comprises flowing the gas, the liquid, and/or the solid into entrance holes of the helical passages, the entrance holes positioned on a top surface of the planar inertial filter. In a second example of the method, optionally including the first example, flowing the gas, the liquid, and/or the solid through the planar inertial filter having helical passages within the porous material further comprises developing partial annular flow as the gas, the liquid, and/or the solid travels through a first section of the helical passages that is proximate to the entrance holes. In a third example of the method, optionally including one or both of the first and second examples, flowing the gas, the liquid, and/or the solid through the planar inertial filter having helical passages within the porous material further comprises developing asymmetric annular flow as the gas, the liquid, and/or the solid travels through a second section of the helical passages that is proximate to the first section and farther from the entrance holes than the first section. In a fourth example of the method, optionally including one or more or each of the first through third examples, flowing the gas, the liquid, and/or the solid through the planar inertial filter having helical passages within the porous material further comprises fully developed annular flow as the gas, the liquid, and/or the solid travels through a third section of the helical passages that is proximate to the second section and farther from the entrance holes than the second section. In a fifth example of the method, optionally including one or more or each of the first through fourth examples, each of the helical passages comprises a tubular void having a boundary formed by the porous material, and wherein flowing the gas, the liquid, and/or the solid through the planar inertial filter having helical passages within the porous material further comprises: impinging the liquid and/or the solid on the boundary of each of the helical passages, and wicking the impinged liquid into the porous material away from the boundary of each of the helical passages. In a sixth example of the method, optionally including one or more or each of the first through fifth examples, the planar inertial filter includes a drain connector, and wicking the impinged liquid into the porous material includes channeling the impinged liquid along one or more draining vias to the drain connector. In a seventh example of the method, optionally including one or more or each of the first through sixth examples, the method further comprises: flowing the gas, and not the liquid and the solid, out of exit holes of the helical passages. In a eighth example of the method, optionally including one or more or each of the first through seventh examples, the exit holes are positioned on a bottom surface of the planar inertial filter that is directly opposite the top surface.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An inertial filter, comprising:
a planar porous material; and
an array of helical passages receiving at least a mixture of at least gas and liquid, each helical passage of the array of helical passages extending from a top surface of the porous planar material to a bottom surface of the porous planar material, the helical passages configured to passively induce centrifugal accelerations that drive liquid of the liquid/gas mixture to outer walls of the array of helical passages where droplets impinge onto the porous planar material and are absorbed, and then are driven by wicking capillary forces away from the helical passage walls.

2. The inertial filter of claim 1, wherein the array of helical passages comprises a plurality of helical passage units, each helical passage unit of the plurality of helical passage units including a central axis extending from the top surface of the planar porous material to the bottom surface of the planar porous material, wherein the planar porous material includes a plurality of separated draining vias extending along a length of the planar porous material, and wherein the capillary forces drive the liquid to the plurality of draining vias, the filter further having a fluid outlet coupled with the plurality of draining vias to collect and drain liquid.

3. The inertial filter of claim 1, wherein each helical passage unit of a plurality of helical passage units comprises at least one helical passage extending along the central axis, the at least one helical passage forming a helical path about the central axis from a first opening in the top surface of the porous planar material to a second opening in the bottom surface of the porous planar material, wherein a filter pressure drop across the inertial filter remains constant until the planar porous material is fully saturated with liquid, and wherein at least portions of the separated draining vias are positioned parallel with one another.

4. The inertial filter of claim 3, wherein each helical passage unit of the plurality of helical passage units comprises one helical passage extending along the central axis from the top surface of the porous material to the bottom surface of the porous material.

5. The inertial filter of claim 3, wherein each helical passage unit of the plurality of helical passage units comprises three helical passages extending along the central axis from the top surface of the porous material to the bottom surface of the porous material.

6. The inertial filter of claim 3, wherein helical passages within each helical passage unit comprises at least one of overlapped helical passages, interwoven helical passages, right handed thread helical passages, or left handed thread helical passages.

7. The inertial filter of claim 1, wherein a cross-section parallel with the top surface of the porous planar material and the bottom surface of the porous planar material of the a passage of the array of helical passages is a kidney shaped hole.

8. The inertial filter of claim 7, wherein the array of helical passages comprises a plurality of helical passage units, wherein each helical passage unit of the plurality of helical passage units comprises three helical passages, and wherein the cross-section of the three helical passages is three non-touching kidney shaped holes having a length greater than a pitch, the length being defined in the cross-section and representing a long dimension of the kidney shaped hole.

9. The inertial filter of claim 1, wherein the porous planar material is configured to absorb and/or retain and/or transport liquid, but generally not gas.

10. The inertial filter of claim 1, wherein the porous material is comprised of a single 3D printed monolith.

\* \* \* \* \*